Jan. 25, 1955 T. H. KUMMER ET AL 2,700,494
ARTICLE HANDLING MECHANISM
Filed June 6, 1950 4 Sheets-Sheet 1

INVENTORS.
Theodore Herman Kummer,
Raymond Emil Bodendoerfer,
By Norman E. H. Weletzke
atty.

Jan. 25, 1955 T. H. KUMMER ET AL 2,700,494
ARTICLE HANDLING MECHANISM
Filed June 6, 1950 4 Sheets-Sheet 2

INVENTORS
Theodore Herman Kummer,
Raymond Emil Bodendoerfer,
By Norman E. H. Weletzke
atty.

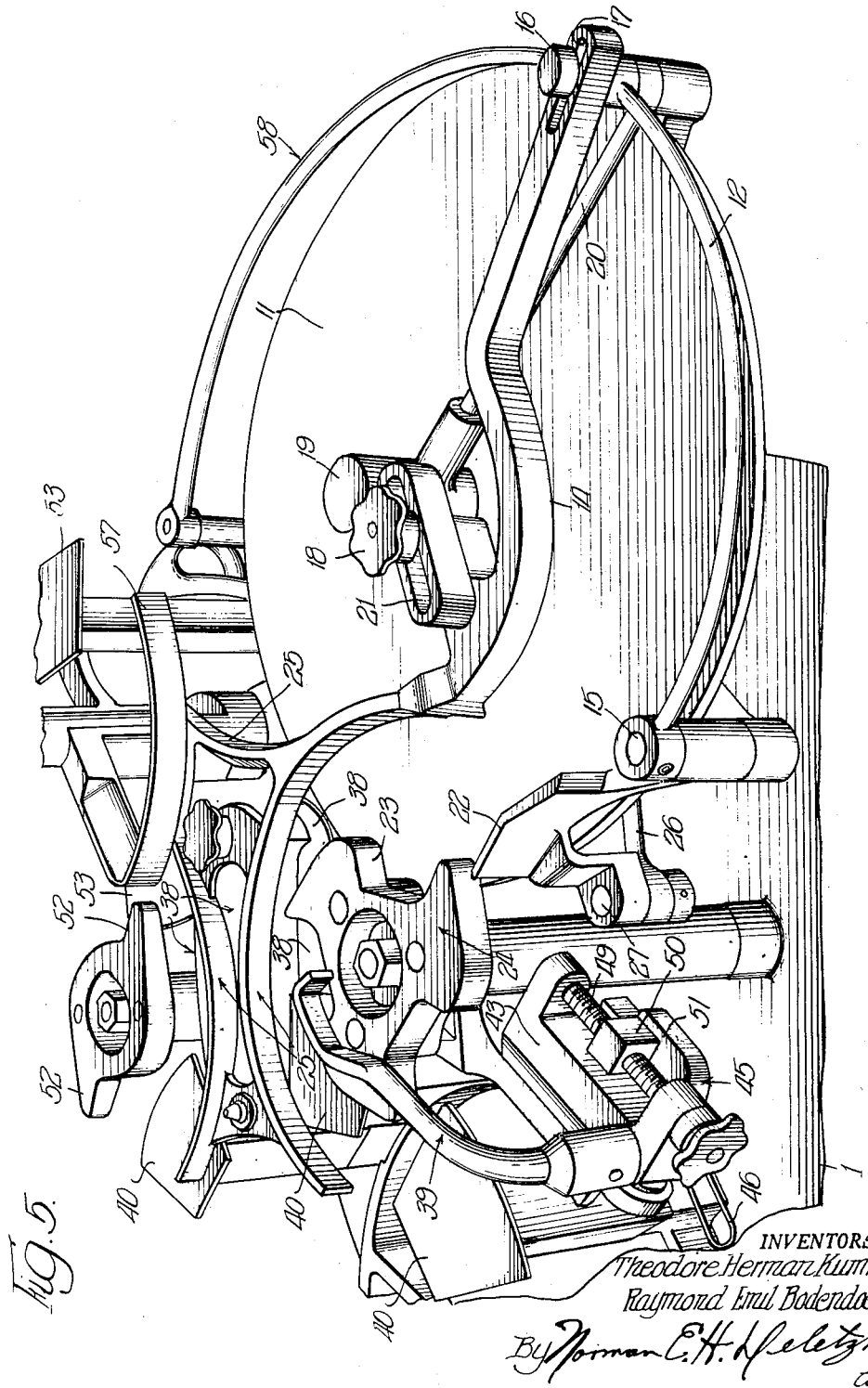

Jan. 25, 1955 T. H. KUMMER ET AL 2,700,494
ARTICLE HANDLING MECHANISM
Filed June 6, 1950 4 Sheets-Sheet 4
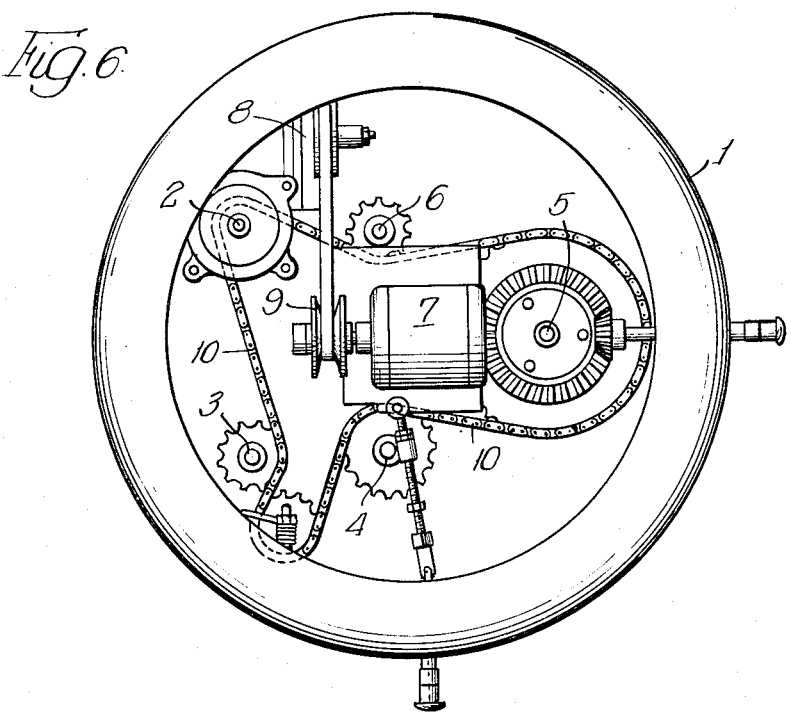
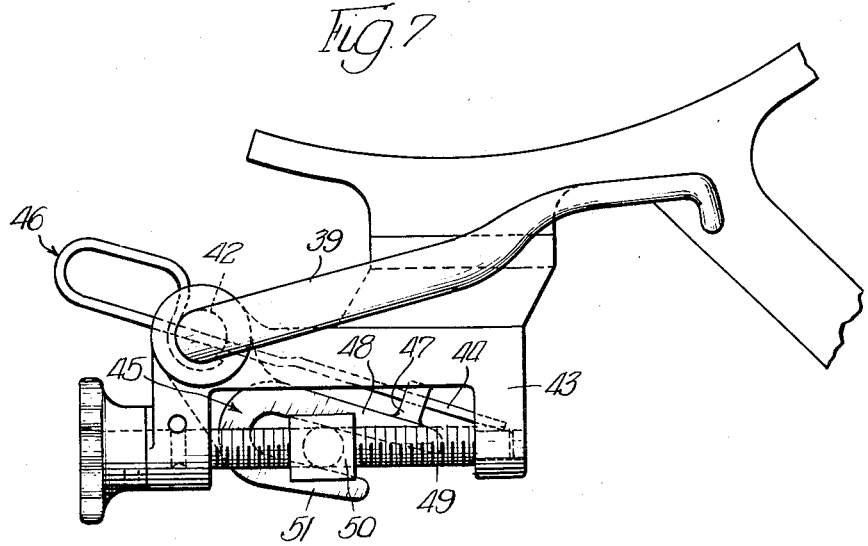
INVENTORS
Theodore Herman Kummer,
Raymond Emil Bodendoerfer,
By Norman E. H. Lietzke
Atty United States Patent Office 2,700,494
Patented Jan. 25, 1955

2,700,494

ARTICLE HANDLING MECHANISM

Theodore Herman Kummer and Raymond Emil Bodendoerfer, Milwaukee, Wis., assignors to Cherry-Burrell Corporation, Chicago, Ill., a corporation of Delaware Application June 6, 1950, Serial No. 166,436

2 Claims. (Cl. 226—97)

This invention relates to improvements in article handling mechanism. More particularly stated, this invention pertains to continuously operating mechanism for continuously or intermittently receiving round or rectangular receptacles and moving them from a receiving station to and from one or more operating stations back to a discharge station.

One of the primary objects of the present invention is to provide a novel receptacle handling mechanism, such as an automatic bottle filling and capping mechanism, readily adjustable for handling either rectangular or round receptacles in a variety of sizes, and employing a continuously operable, combined receiving and discharge table, adapted for manually loading and unloading of receptacles or automatic loading and unloading of receptacles.

Another object of the invention is to provide an arrangement of receptacle guides above the receiving and discharge table, which may be adjusted to accommodate receptacles of different sizes and which divides the areas above the table into a supply zone or station for empty receptacles and a discharge zone or station for filled and capped receptacles.

A specific object of the invention is to provide a continuously rotating star wheel for receiving receptacles to be filled from a receiving and discharge table, and to transfer such empty receptacles to and accurately position them upon the continuously moving receptacle supports on a turn-table at a receptacle filling station, together with adjustable gates and guides mounted contiguous to the path of movement of the receptacles into and away from the star wheel to control the movement of the receptacles into the star wheel from the receiving and discharge table, and to accurately position the empty receptacles upon the supports at the filling station.

A further specific object of the invention is to synchronize with the operation of the receiving table the operation of a gate controlling the movement of receptacles from the receiving table into the star wheel.

A further object of the invention is to provide continuously operable mechanism for transferring filled receptacles from the filling station to a capping station, and accurately position the filled receptacles on the receptacle supports at the capping station.

Another specific object of the invention is to provide a capping mechanism, wherein the entire capping mechanism, including the cam for lifting the receptacle supports and including the support actuating and capping head actuating drive shaft are assembled as a unit and mounted as a unit for support and actuation on the base of the combined receptacle filler and capper. Stationary receptacle guide means are associated with said receptacle capping mechanism, and receptacle discharge wings are also associated with each receptacle support of said receptacle capping mechanism, whereby to discharge capped receptacles from said receptacle capping mechanism into the discharge station of the receiving and discharge table.

Another object of the invention is to provide means, whereby the mechanism is almost entirely assembled of standard parts, which may be interchanged at the time of assembly to adapt the machine either for right-hand or left-hand operation, and by the use of a single drive chain to synchronously drive the receiving and discharge table, transfer star wheel, receptacle filling mechanism, filled receptacle transfer mechanism, and receptacle capper, all with the driving power applied directly to the drive shaft of the capping mechanism.

The foregoing and other objects of the invention will be more apparent and will be more readily understood when read in connection with the drawings, illustrating the preferred embodiment of the apparatus contemplated by this invention, and in which drawings—

Figure 5 is a view, in perspective, on an enlarged scale of a portion of the improved article handling mechanism, arranged for the manual loading and unloading of empty and filled receptacles onto and from the supply and discharge stations, respectively, of the rotary supply and discharge table.

Figure 6 is a view of the synchronized drive mechanism of the article handling apparatus, as viewed from below.

Figure 7 is a plan view of the receptacle guide for accurately positioning receptacles on the receptacle supports at the receptacle filling station.

Figure 1:
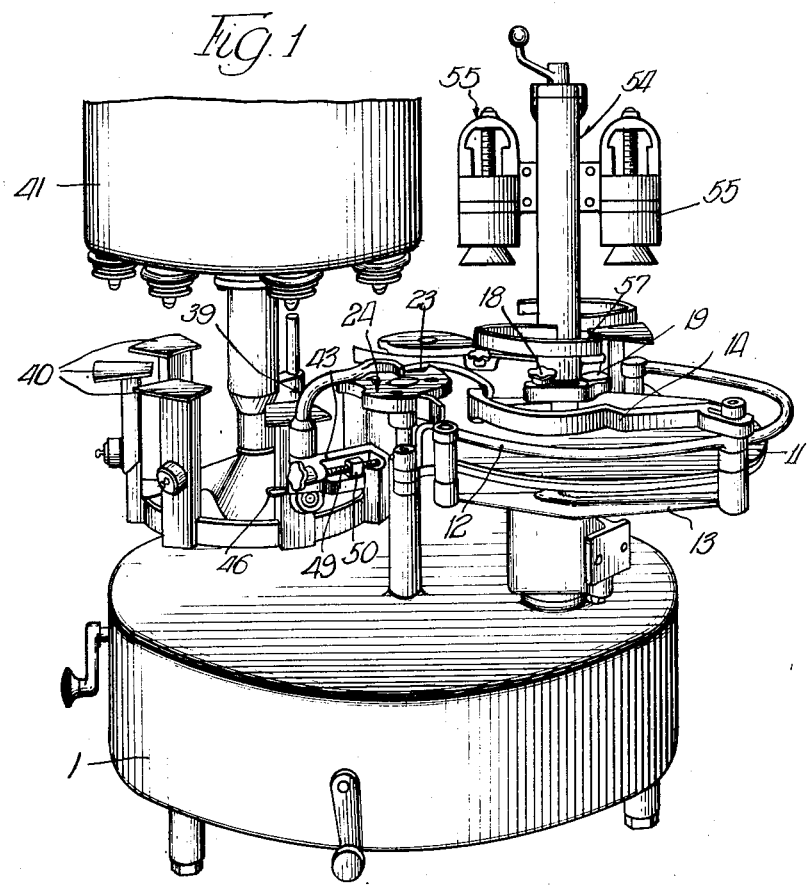
Figure 1 is a view, in perspective, of the improved receptacle handling mechanism, as embodied in a receptacle filler and capper.

Referring to the drawings, wherein like numerals are used to identify like parts, 1 represents a base upon which an improved apparatus, of the type contemplated by this invention, may be mounted. As clearly illustrated in Figure 6 of the drawings, the base 1 supports the drive shafts 2, 3, 4, 5 and 6, which are, respectively, the drive shafts for the receptacle capper, the receiving and discharge table, the transfer star wheel, the receptacle filling turntable, and the filled receptacle transfer vanes. The drive shaft 2 of the receptacle capper is powered directly by motor 7 through a suitable gear reducer 8 and variable speed mechanism 9. The drive shafts 2, 3, 4, 5 and 6 are all suitably sprocketed and with such sprockets a drive chain 10 is associated, whereby to drive the drive shafts 3 to 6, inclusive, synchronously with the shaft 2 and of necessity synchronously actuate the various devices powered by the shafts 2 to 6, inclusive.

Figure 2:
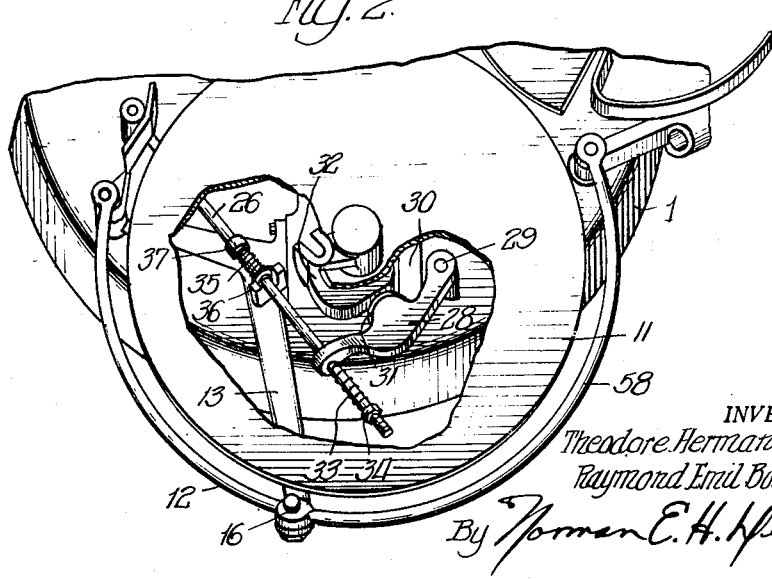
Figure 2 is a view, in perspective, partially in broken-away section, illustrating the arrangement for synchronizing the movement of the receiving and discharge table and the infeed gate controlling the movement of empty receptacles from the table into the transfer star wheel.

The variant of the invention illustrated in Figures 1, 2 and 5 of the drawings, contemplates the manual loading and unloading of receptacles from the continuously rotating receiving and discharge table 11. On table 11, which is provided with a disk-like receptacle supporting surface, the receptacles resting thereon are frictionally advanced. Receptacles to be filled are supplied to the table 11 between the outer guide rail 12, supported on bracket 13, and the adjustable inner guide rail 14. The outer guide rail 12 is supported at both ends on studs 15 and 16 extending upwardly from bracket 13. Inner guide rail 14 is slidably supported at its outer end upon stud 16, which extends through slot 17 in rail 14. At its inner end, rail 14 is adjustably supported by thumb screw 18 upon bracket 19 pivoted to the upper end of the drive shaft 2 of table 11, and restrained from rotating with shaft 2 by linkage 20. Linkage 20 connects the bracket 19 to the stud 16 on bracket 13. Bracket 19 is slotted at 21 for receiving the thumb screw 18, which is associated with the underlying portion of the inner guide rail 14, whereby the inner end of rail 14 is supported upon the bracket 19.

The infeed gate 22 is hinged to stud 15, and is positioned as an extension of outer rail 12 and opposite the inner end of guide rail 14. Gate 22, in a manner hereinafter to be described, is pivoted toward and away from the inner end of rail 14 to restrain the movement of empty receptacles from the receiving station of table 11 into the pockets 23 of transfer star wheel 24.

The adjustably mounted inner rail 14, which is adjustable toward the gate 22 and star wheel 24 or adjustable away from the gate 22 and star wheel 24, may be adjusted to compensate for various sizes and cross sections of containers or receptacles being handled, whereby to assure the engagement and retention of the receptacles by gate 22 when in its innermost or receptacle engaging position. Complementary infeed and discharge guides 25 are required for the different positions of adjustment of the rail 14.

The rotary motion of table 11 and star wheel 24 are synchronized as before described. The pivotal motion of the gate 22 is synchronized with the motion of table 11 and star wheel 24, and is actuated by linkage 26, pivotally supported at its outer end upon gate 22 by stud 27. The inner end of link 26 is slidably supported on cam follower lever 28, through the one end of which it extends. Lever 28 at its opposite end is suitably hinged by pin 29 to bracket 30. Cam follower lever 28 is provided with roller 31 for engaging the cam 32 on the drive shaft 3, immediately below table 11. Upon the rotation of the shaft 3, the cam 32, through roller 31, causes the oscillation of lever 28 upon pivot pin 29. The oscillation of lever 28 away from gate 22 is transmitted to link 26, through compression spring 33, telescoped over the inner end of link 26. The compression of spring 33 is suitably adjusted by the adjustment of nut 34 threaded to the inner end of link 26. The return of the gate 22 to open position, as well as the inward oscillation of lever 28 toward the cam 32, is caused by the outward motion of link 26 resulting from the expanding action of compression spring 35, telescoped over the mid-section of link 26, intermediate lever 28 and gate 22, and suitably compressed between the fixed spring stop 36 and adjustable collar 37 on link 26.

The adjustment of the rotary motion of star wheel 24 and table 11 is such that upon the passage of a receptacle past gate 22, the receptacle is moved by table 11 into a pocket 23 of the transfer star wheel 24. The fixed receptacle guide 25 retains the receptacle in pocket 23 while the receptacle is moved over transfer table 38, past the receptacle positioning arm 39, onto receptacle support 40 of the turn-table below the filler reservoir 41.

The free end of the positioning arm 39 is adapted to engage the adjacent surface of non-round receptacles, such as receptacles having rectangular cross-sections, and, together with guide 25, force such receptacles into a predetermined position in the pockets 23 of the star wheel 24, so as to assure the proper positioning of the receptacles on the lifters 40. To accommodate different sizes of receptacles and to prevent breakage, the lever 39 is spring biased and adjustably mounted by pivot pin 42 upon the bracket 43, suitably secured to a fixed portion and operating element or frame-like element of the apparatus. As clearly illustrated in Figures 5 and 7 of the drawings, pivot pin 42, which is swiveled to bracket 43, is keyed at its upper end to the lever 39. The lower end of pin 42 extends below bracket 43. Tong means 45 are pivotally supported on the lower end of pin 42, and are disengageably locked thereto by spring clip 46. One end of spring clip 46 engages the outer surface of the pin 42, in a restraining manner, while the free end 44 of spring 46 extends through a hole in pin 42 below the tongs or fork 45 and through a hole in lug 47 on the branch 48 of tongs 45.

Screw 49 is pivotally supported on bracket 43, and the axis of screw 49 is transverse to the axis of tongs 45. Nut 50, threaded to screw 49, engages the tongs 45 between the branches 48 and 51 of the tongs 45. Upon the rotation of screw 49, nut 50, which is prevented from turning with screw 49 due to its engagement with branches 48 and 51 of tongs 45, will be forced to travel along screw 49 between the branches 48 and 51 of tongs 45, thereby partially rotating the pivoted tongs 45 upon the pin 42. The rotary motion of tongs 45 is transmitted by spring 46 to the pivot pin 42, and thence to the lever 39. The appropriate adjustment of screw 49 is required to adjust lever 39 for different size receptacles, and the use of clip spring 46 to control the motion of lever 39 provides a limited form of escape motion for lever 39 in the event of engagement with an oversize receptacle, as well as provides an arrangement which lends itself well for rapid and easy assembly and disassembly.

Filled receptacles are discharged from the lifters 40 by the rotary receptacle transfer arm or vanes 52, which urge the filled receptacles against the adjacent surface of the fixed rail of the guide element 25 over the transfer table 38, and thence onto the receptacle lifters 53 of the receptacle capper 54. To apply caps to the filled receptacles, the receptacles are raised by lifters 53 so that the upper ends of the receptacles extend into the capping heads 55, during the rotation of the capper assembly 54. During such rotation, the lifters 53 are forced upwardly by cam 56, which is formed as an integral part of the capper assembly, and with the remainder of the capper assembly 54 is supported as a unit on the frame 1. The capped receptacles are removed from the capper lifters 53 and discharged onto the rotating table 11 by the engagement of the capped receptacles with a branch of the guide rail 25, together with the engagement of the capped receptacles by the rotary cam-like bottle discharge arms 57, which are associated with each of the several lifters 53 of the capper 54, and which, together with the guide rails 25, urge the capped receptacles off of the pedestals 53 onto the discharge section of the table 11, intermediate the outer guide rail 58 and the guides 25 and 14.

Figure 3:
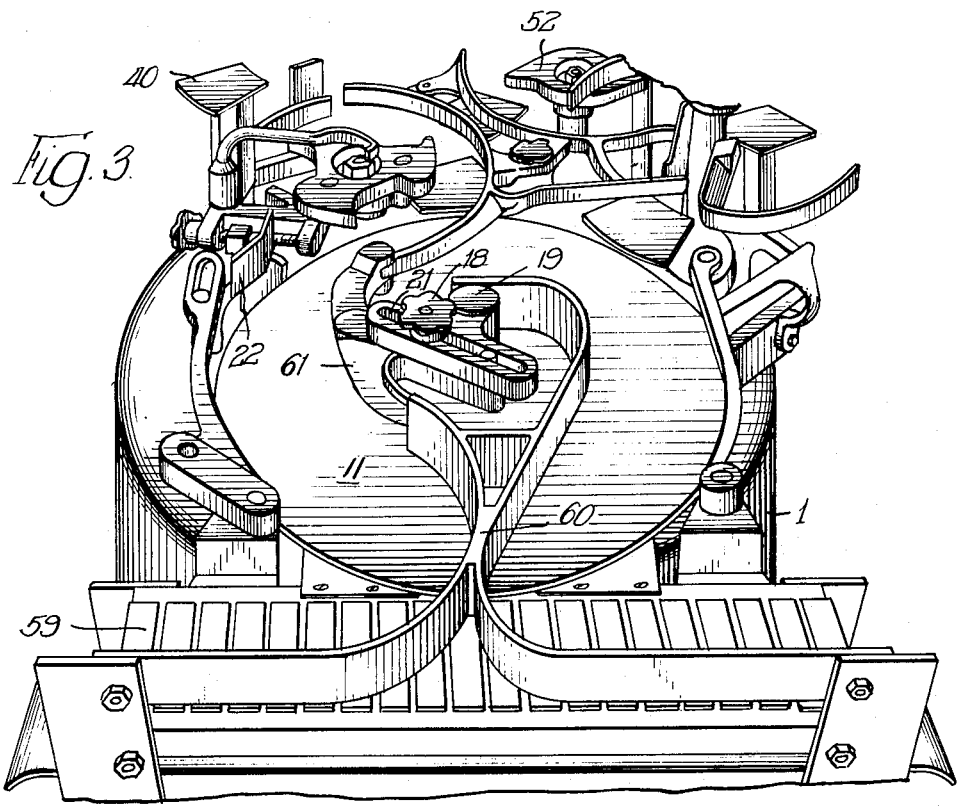
Figure 3 is a view, in perspective, of a portion of the improved article handling mechanism connected to a continuously operable receptacle conveyer for supplying empty receptacles to the mechanism and for removing filled receptacles from the mechanism.
Figure 4:
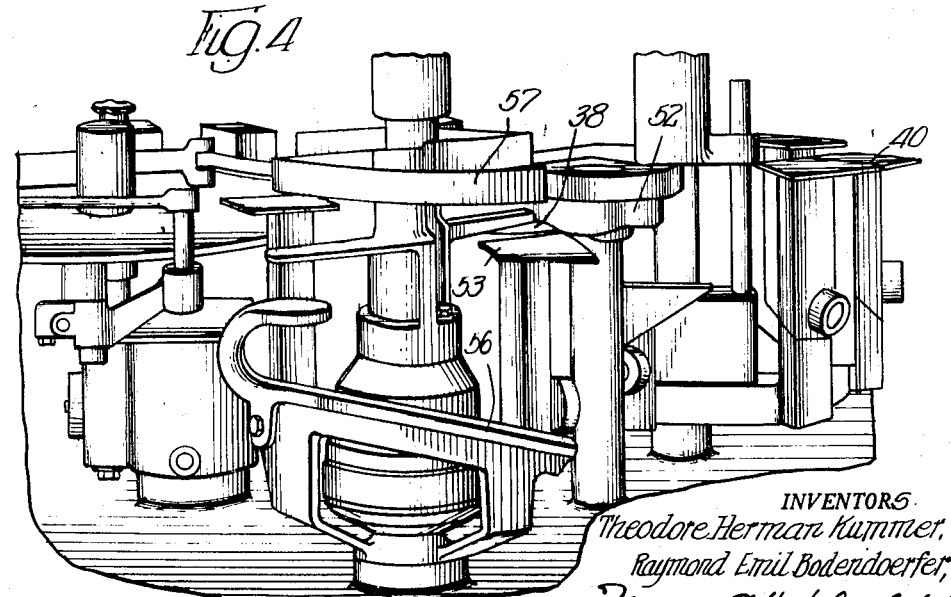
Figure 4 is a view, in perspective, of a portion of the receptacle handling mechanism, as viewed from the opposite side of the mechanism illustrated in Figure 1 of the drawings.

In the event that it may be desired to employ a continuous, straight-line type conveyor 59 to supply empty receptacles to the receiving station of table 11 and to remove capped receptacles from the discharge section of table 11, as illustrated in Figure 3 of the drawings, then a revised guide rail 60 may be used in conjunction with the adjustable bottle guide 61, in substitution for the elements 14 and 20, illustrated in Figure 5 of the drawings.

As will also be apparent, upon an inspection of Figure 6 of the drawings, the drive shafts 2 and 3, which operate the capping mechanism and the supply and discharge table, respectively, are symmetrically positioned with respect to a line extending through the center of the axis of the drive shaft 5, which is used to actuate the turn-table receptacle filler mechanism. Similarly, the drive shafts 4 and 6 are symmetrically positioned with respect to the same line extending through the drive shaft 5. By this expedient, it is possible, in the assembly of an apparatus, to interchange the positions of the shafts 2 and 3 and the associated mechanism, as well as to interchange the positions of the shafts 6 and 4 and the associated mechanism, thereby enabling the use of the same base, shafts, and drive mechanisms for either a right-hand or a left-hand apparatus.

It will be apparent, from the foregoing description of the invention, that the applicants have provided an improved type of article transfer mechanism, wherein a single, continuously rotating, supply and discharge table may be used to receive empty receptacles manually, as well as to arrange for the manual discharge of filled receptacles, or to receive empty receptacles and discharge filled receptacles from and to a continuously moving conveyer. The improved apparatus is adapted for the handling of either round receptacles or non-round receptacles. In the event of the use of the apparatus for round receptacles, the positioning lever 39 is not required and may, if desired, be so adjusted as not to come in contact with the receptacles being moved through the star wheel 24. The invention also provides a relatively simple, yet highly efficient, synchronized receptacle transfer mechanism, involving the continuously rotating supply and discharge table, the continuously rotating transfer star wheel, and the synchronized infeed control gate 20, as well as the automatically acting receptacle positioning finger 39.

The invention also provides a simple and unique arrangement for the automatic discharge of capped receptacles from the capping unit into the discharge station of the supply and discharge table. The unique arrangement in a capping mechanism, wherein all of the parts are assembled as a unit and mounted as a unit on the base, enables the accurate adjustment thereof, and simplifies the construction of the apparatus and the assembly operations. The direct application of power for the combined apparatus to a capping mechanism, which, under normal conditions, provides the heaviest load, and the indirect application of power by means of the drive chain to the remaining portions of the apparatus, assures the continuous, satisfactory, synchronized operation of the apparatus.

Having thus described and illustrated the preferred embodiment of the invention, the invention is not intended to be restricted to the specific embodiment thereof, as illustrated in the drawings, and as described, except insofar as may be necessary in view of the disclosure of the prior art and as may be necessary in view of the appended claims.

The invention is hereby claimed as follows:

1. In combination with a receptacle filler having a plurality of receptacle supports spaced radially substantially equidistant from a central vertical axis and adapted to move therearound in a circular path, means for delivering receptacles successively to the respective supports and aligning said receptacles thereon comprising a rotatable receptacle propelling gear having a receptacle receiving recess therein and a receptacle pushing leg in trailing relation with respect thereto as said gear is rotated, a substantially arcuate guide member spaced radially from said gear to provide a path of movement for receptacles therebetween from a receptacle receiving end to a receptacle discharge end over a receptacle support, and a receptacle aligning arm pivotally mounted at one of its ends and having the other end free and normally positioned over the path of movement of said receptacle pushing leg adjacent the discharge end of said path of movement for receptacles over said receptacle support, said receptacle aligning arm being spring activated to exert pressure at its free end toward the aforesaid guide member and yieldable to permit passage of receptacles of varying sizes therebetween so that receptacles delivered by said propelling gear to said bottle supports are aligned thereon by the pressure of the said receptacle aligning arm on said receptacles against said guide member at the discharge end of said path of movement.

2. In a receptacle handling device of the class described, the combination of a continuously movable receptacle platform adapted to move in a substantially circuitous orbit, a feed gear adjacent to said orbit and adapted to move a receptacle to a position on said platform, a relatively arcuate guide bar spaced from said feed gear and adapted to retain said receptacle in operative engagement with said feed gear, said guide bar having an end portion substantially tangential with the inner circumference of the aforesaid substantially circuitous orbit, and an aligning arm substantially tangential with the outer circumference of said substantially circuitous orbit and having a yieldable hump projecting toward said end portion of the guide bar whereby a receptacle moved by said feed gear to a position on said receptacle platform is aligned thereon in a predetermined manner against the end portion of the guide bar by pressure of the aligning arm hump at the opposite side of said receptacle.

References Cited in the file of this patent

UNITED STATES PATENTS

| | | |
|---|---|---|
| 1,200,377 | Lowe | Oct. 3, 1916 |
| 1,377,395 | Calleson | May 10, 1921 |
| 2,103,158 | Kantor | Dec. 21, 1937 |
| 2,122,149 | Lippold | June 28, 1938 |
| 2,176,557 | Lippold | Oct. 17, 1939 |
| 2,184,493 | Gladfelter | Dec. 26, 1939 |
| 2,202,640 | Thomas | May 28, 1940 |
| 2,300,398 | Lippold | Oct. 27, 1942 |
| 2,324,312 | Meyer et al. | July 13, 1943 |
| 2,393,389 | Lippold | Jan. 22, 1946 |